Patented Mar. 31, 1931

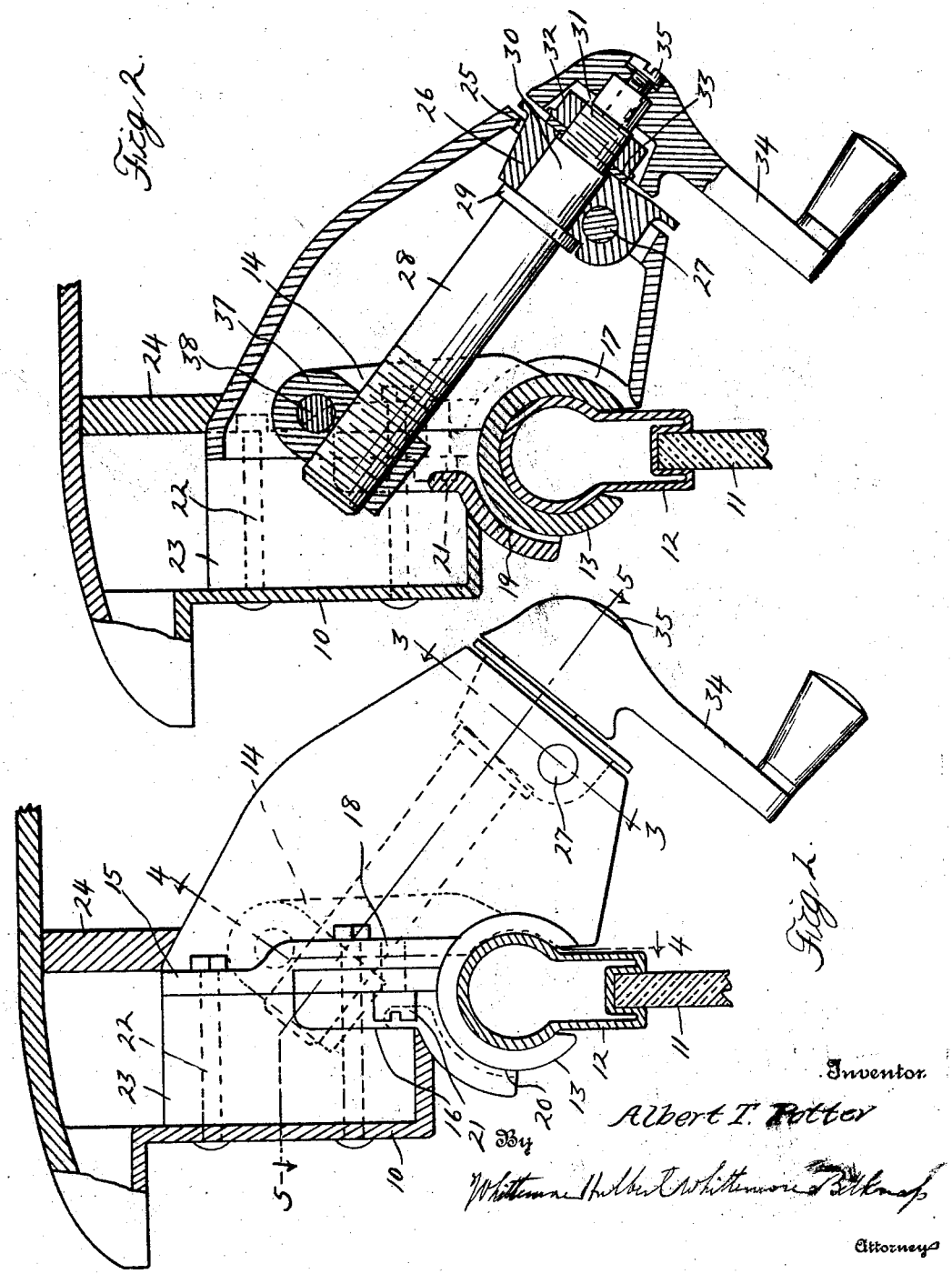

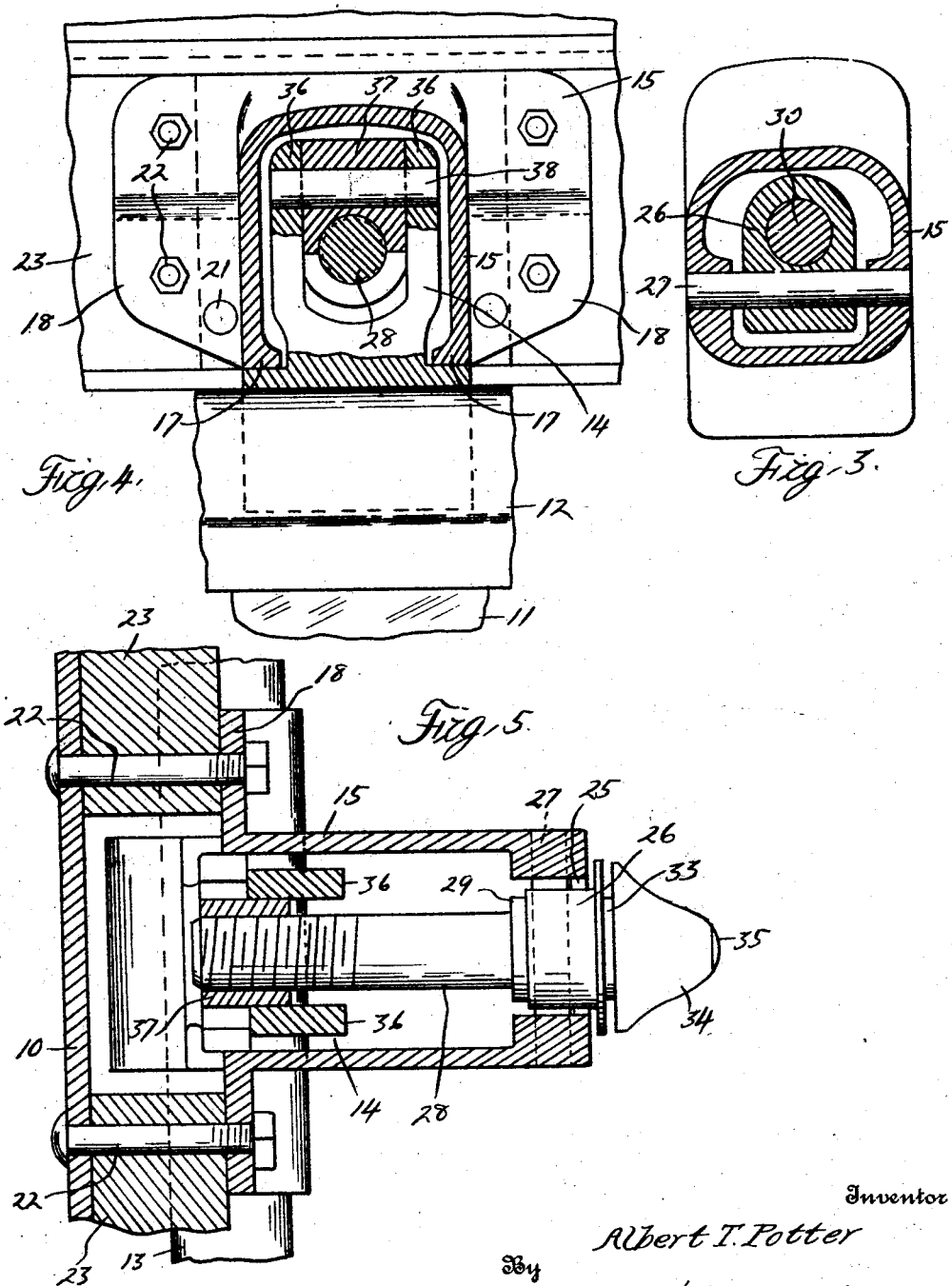

1,798,353

UNITED STATES PATENT OFFICE

ALBERT T. POTTER, OF DETROIT, MICHIGAN, ASSIGNOR TO AINSWORTH MANUFAC-
TURING COMPANY, OF DETROIT, MICHIGAN, A CORPORATION OF MICHIGAN

WINDSHIELD-OPERATING MECHANISM

Application filed November 15, 1926. Serial No. 148,559.

This invention relates to windshield operating mechanism and more especially to mechanism of this character for use in connection with swinging windshields pivoted upon horizontal pivots.

The invention has as one of its primary objects to provide a mechanism of this character which is distinguished by its simplicity, which may be manufactured economically, assembled with facility and operated with ease. Another object of the invention is to provide an apparatus of this character which is capable of transmitting small adjustments to the windshield, is self locking and will not rattle in use.

The several objects, advantages and novel details of construction of this invention will be made more apparent as this description proceeds, especially when considered in connection with the accompanying drawings wherein:

Figure 1 is a side elevation of my improved windshield operating mechanism with the header and windshield frame in vertical cross section.

Figure 2 is a vertical longitudinal sectional view through the mechanism.

Figure 3 is a detail sectional view taken substantially on the plane indicated by line 3—3 in Figure 1.

Figure 4 is a sectional view taken substantially on the plane indicated by line 4—4 in Figure 1, and Figure 5 is a sectional view taken substantially on the plane indicated by line 5—5 in Figure 1.

Referring now particularly to the drawings wherein like reference characters indicate like parts it will be noted that there is fragmentarily illustrated in cross section a header 10 to which the operating mechanism of the windshield is connected. The reference character 11 indicates a windshield and 12 the windshield frame. Surrounding the frame 12 is a semi-circular sleevelike member 13 carrying an operating arm 14. The semi-circular portion 13 of the arm 14 constitutes a bracket by means of which this arm is rigidly connected to the top frame of the windshield.

The operating mechanism for the windshield is substantially enclosed by means of a housing formed of a pair of complementary sections 15 and 16. The main housing section or unit 15 is provided with spaced arcuate or semi-circular bearing portions 17 which partially encircle the bracket 13 of arm 14 and have bearing engagement therewith as most clearly illustrated in Figure 4. This housing section is also provided with laterally extending flanges or ears 18 by means of which connection is made with the header 10 and with the complementary section 16. The complementary section 16 is provided with an arcuate or semi-circular portion 19 the ends 20 of which have a bearing engagement with the sleeve 13 of lever 14, the center portion thereof being preferably spaced from the sleeve 13 as most clearly illustrated in Figure 2. The two housing sections 15 and 16 are secured together by means of bolts or screws 21 passing through the vertically extending portions of the housing section 16 and through the ears 18 of housing section 15. The two housing sections are additionally secured together and are supported upon the header by means of bolts 22 which pass through the header and through filler blocks 23 arranged therein, the lower of these bolts passing through aligned apertures in the two housing sections while the upper of these bolts engage only the flanges 18 of the main housing section. In practice it is customary to provide an inner finish strip 24 such as suggested in Figures 1 and 2.

The main housing section 15 is provided with an aperture 25 in which a journal member 26 is arranged. This journal member is rockably supported by means of a transverse pin or shaft 27 the ends of which are supported in the housing section 15. The operating shaft or rotatable screw 28 is preferably provided with a thrust collar 29 and a reduced portion 30 engaging the journal 26. That portion of the shaft indicated by the reference character 31 is threaded for engagement by thrust nut 32 which engages a washer 33 arranged between the nut and the journal 26. The end of the shaft 28 which extends out of the housing is suitably shaped for engagement by handle 34 secured in place by screw 35 by means of which shaft 28 may be rotated.

The upper end of lever 14 is bifurcated to provide the spaced arms 36 between which a nut or threaded element 37 is mounted by means of a shaft or pin 38. By means of this connection a relatively rocking movement is permitted between nut 37 and lever 14. The nut 37 engages the threaded shaft 28 so that a rotation of this shaft will cause a longitudinal displacement of the nut and as a consequence a rocking or oscillation of windshield operating arm 14.

In operation a rotation of screw shaft 28 by means of handle 34 will cause the traveling element or nut 37 to be displaced longitudinally of shaft 28 and owing to the connection between the traveling nut and lever 14 the windshield 11 will be swung to open or closed position. The connection between the arm 14 and operating screw 28 will cause a rocking of the latter when the windshield is operated but this is provided for by the rockably mounted journal 26. Owing to the fact that this rockable support for screw 28 is arranged adjacent to the end upon which the handle is connected the handle end will not be rocked to any appreciable extent and will be always conveniently accessible to the driver of the vehicle.

It will also be apparent that by forming the housing units or sections 15 and 16 with the semi-circular bearing portions 17 and 20 respectively which engage the sleevelike bracket 13 of the arm 14, any relative displacement between the operating screw and the windshield operating arm which might result from the parts springing away when pressure is applied, is eliminated. Thus any displacement which would interfere with the easy operation of the mechanism will be prevented.

The herein described construction is one which facilitates assembly as the operating mechanism may be shipped separately and assembled in the assembling room of the factory by securing the two housing sections 15 and 16 together in engagement with the top of the windshield and to the header in the manner more fully hereinbefore referred to. It is obvious that by altering the pitch of the threads upon the screw and traveling nut the rapidity with which the windshield may be operated can be altered as found necessary or expedient. In any event the mechanism is self-locking so that the windshield will be held against accidental displacement in any position of the parts.

It will be obvious that the construction lends itself admirably to economical production in large quantities and further that the device may be assembled with facility. It will also be obvious to those skilled in this art that changes in some of the essential and all of the non-essential details of the herein described structure may be made without in any wise affecting the invention involved and to this end reservation is made to make such changes as may come within the purview of the accompanying claims.

What I claim as my invention is:

1. In combination, a swinging windshield, operating mechanism for said windshield, a housing for said operating mechanism, a rotatable screw disposed within said housing, a member having an opening therein for receiving one end of said screw, means pivotally connecting said member to the housing including a pin journalled within the housing and extending through said member substantially below the opening in the latter for the said screw, a travelling nut upon said screw, and an arm having one end connected to the windshield and the opposite end pivotally connected to said nut substantially above the connection of the latter with the screw.

2. In combination, a pivotally mounted windshield having a longitudinally extending tubular frame member, an operating arm terminating at one end in an arcuate portion secured to the tubular frame aforesaid, an operating shaft for said arm, a housing substantially enclosing said shaft and formed of a pair of complementary sections, one of said sections formed with spaced arcuate bearing portions having a bearing engagement with the arcuate portion aforesaid of the arm upon opposite sides of the latter and said sections being also formed with portions providing for the attachment of the housing to a vehicle.

3. In combination, a swinging windshield, operating means for said windshield, a housing for said operating means, a rotatable and rockable screw journalled within said housing, means disposed upon one side of the axis of said screw for pivotally connecting the same to the housing, a travelling nut upon said screw, an operating arm connected to the swinging edge of said windshield, and means arranged upon the opposite side of the axis aforesaid for pivotally connecting said nut to the said arm.

4. In a windshield regulating mechanism, a frame, a windshield having its upper edge pivotally mounted in said frame so that the lower edge of said windshield may swing in an arc, a housing attached to said frame and co-operating therewith in supporting the upper edge of said windshield, a rotatable screw in said housing, a traveller nut on said screw and adapted to move longitudinally thereof when said screw is rotated, arms extending from the upper edge of the windshield and connected to said nut whereby travel of said nut imparts a swinging movement to said windshield, and means in said housing pivotally supporting said screw so that said screw may adjust itself during movement of said windshield.

In testimony whereof I affix my signature.

ALBERT T. POTTER.